US007222583B2

(12) United States Patent
Foster et al.

(10) Patent No.: US 7,222,583 B2
(45) Date of Patent: May 29, 2007

(54) DIRECTIONAL BROADCAST FEEDER FOR FISH AND GAME

(75) Inventors: H. Dell Foster, Spring Branch, TX (US); Paul B. Sides, San Antonio, TX (US)

(73) Assignee: Texas Hunter Products, San Antonio, TX (US)

( * ) Notice: Subject to any disclaimer, the term of this patent is extended or adjusted under 35 U.S.C. 154(b) by 63 days.

(21) Appl. No.: 10/833,292

(22) Filed: Apr. 28, 2004

(65) Prior Publication Data

US 2005/0241588 A1 Nov. 3, 2005

(51) Int. Cl.
*A01K 5/00* (2006.01)

(52) U.S. Cl. .................................................. 119/57.91

(58) Field of Classification Search ............ 119/51.11, 119/52.1, 53, 57.1, 57.91, 57.92, 51.04; 222/277, 222/410, 333, 239; 239/681
See application file for complete search history.

(56) References Cited

U.S. PATENT DOCUMENTS 3,717,127 A 2/1973 Porterfield
4,124,166 A * 11/1978 Lucas .......................... 239/662
4,986,220 A 1/1991 Reneau et al.
5,143,289 A 9/1992 Gresham et al.
5,368,192 A 11/1994 Ransom, II
5,732,652 A 3/1998 Allen
5,820,035 A 10/1998 Johnson et al.
5,862,777 A 1/1999 Sweeney
6,082,300 A 7/2000 Futch

* cited by examiner

*Primary Examiner*—T. Nguyen
(74) *Attorney, Agent, or Firm*—Sughrue Mion, PLLC

(57) ABSTRACT

A broadcast feeder for projecting food aggregate or pellets directionally into an area up to, for example, sixty or more feet away from the feed container. The action is controlled to provide a predetermined quantity of aggregate at a predetermined time. The velocity of the feed as it exits the feeder is such that the area directly surrounding the feeder is free of feed particulate. A modular design affords the ability to operate as a self-contained unit with its own storage hopper or as a retrofit module added to existing conventional barrel type scatter type feeders. The projection of the feed is accomplished by propelling the feed pellets with a center intake centrifugal air blower assembly designed such that no special feed gates, baffles or chutes are required.

11 Claims, 4 Drawing Sheets

FIGURE 1.
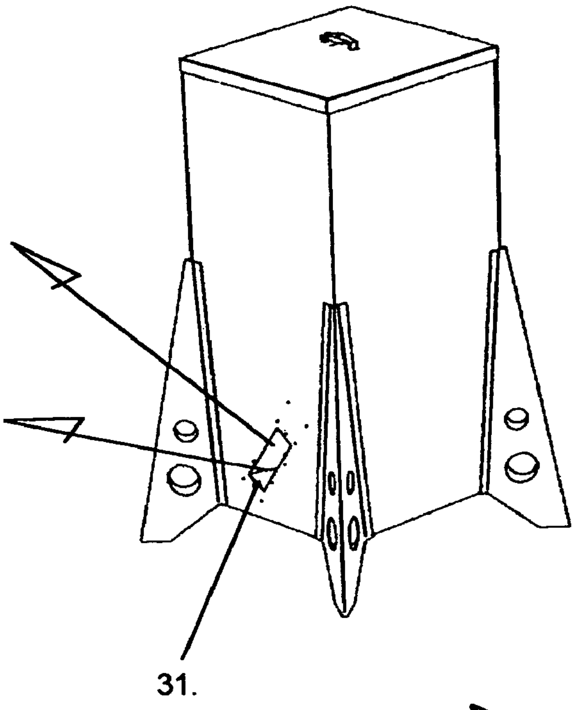
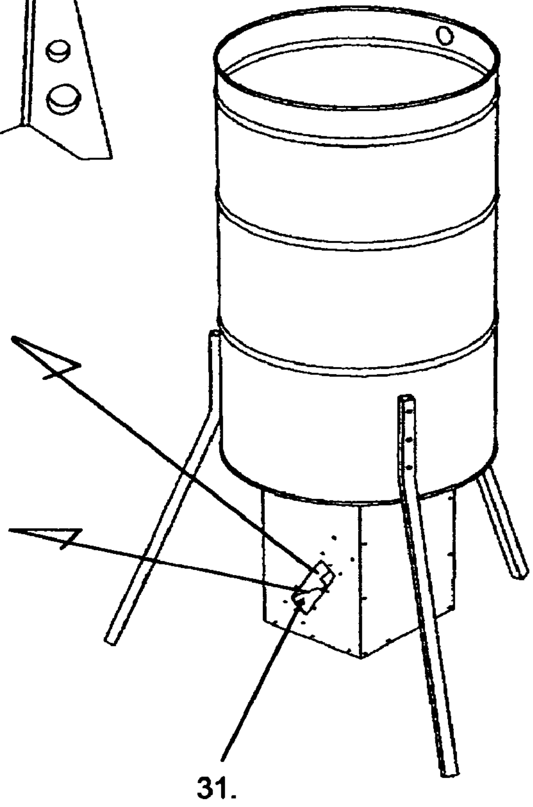
FIGURE 2.

DIRECTIONAL BROADCAST FEEDER FOR FISH AND GAME

TECHNICAL FIELD OF THE INVENTION

Various types of active or powered game feeders are available which utilize a battery-powered timer and electric motor to provide energy to scatter or broadcast particulate feed over an area for animal, bird or fish consumption. The simplest of this type of feeder is the scatter plate type feeder, which utilizes a rotating disk of various forms to propel the feed outward in a circular arc around the periphery of the feed station. Directional feeders are also available. Directional feeders use a high speed rotating finned paddle wheel to accelerate and propel the feed unidirectionally from the dispensing apparatus. Functionally the paddles contact the feed and continually impart a force to the food pellets sufficient to ensure they are expelled at a rate that prevents them from accumulating about the food pellet dispensing apparatus. The present invention uses a center feed centrifugal air blower design to create a spiraling high velocity air flow to accelerate the food pellets along the compressor blades and impart a force sufficient to propel the feed particulate away from the feeder in a unidirectional manner.

BACKGROUND OF THE INVENTION

The majority of existing game feeders, which function to a predetermined feeding schedule, are scatter plate type feeders. This type of feeder generally consists of a barrel type bulk container with a funnel located at the base. Suspended below the funnel is a disk or scatter plate directly attached to a battery driven motor which is controlled by an electric timer. When the scatter plate is stationary the feed flows out of the funnel onto the stationary scatter plate and accumulates upwards in a conical shape until it restricts the opening and stops further flow. At preprogrammed feed intervals the timer applies power to the motor. Powered rotation of the scatter plate creates an inertial force on the feed particulate, slinging it out in a circular unidirectional sweep around the feeder. Fins and sidewalls are frequently added to the scatter plate to stabilize the feed cone or increase the feed throw distance. The first function of the scatter plate is to act as a valve to turn the feed flow on and off from the funnel. The secondary function is to broadcast the feed out in a circular pattern for consumption. Scatter plate type feeders are simple reliable and low cost for most general game feeding requirements.

There are, however, numerous game feeding requirements where the conventional scatter type game feeders are severely limited. Typical of these applications is when the feed must be projected out away from the feeder in a single direction to a predefined feed area. For example, a typical requirement for a directional feeder arises when the bulk feeder is or must be protected behind a corral, structure or fence, and, thus, the feeder must project feed into an open or game accessible area. A further example is projecting feed into a fishpond or lake without the use of floats, docks, and cables or floating assemblies. Both, scatter-type feeders and directional feeders are useful for commercial or private game management. The purpose of the present invention is to simplify the application between the two types of feeders discussed, whereby a stand-alone, bulk directional feeder can be utilized or a conventional scatter feeder can be converted to a directional type by the addition of a directional feeder module. The directional feeder modules can be added to or removed from the conventional feeders as requirements dictate.

SUMMARY OF THE INVENTION

To address the issues discussed above in regard to conventional feeders, the present invention is directed to the design and application of a primary module, which is a center intake, centrifugal air blower assembly for a feeder. On a center intake compressor or blower, air is drawn through a opening at the center of a spiral case and rotating impeller. As the air is drawn in it is rapidly accelerated outward in a spiral motion and forced by this rotating centrifugal force to the larger opening or exhaust at the front of the spiral housing. A low-pressure area is created at the central intake point and as the impeller accelerates the air, the pressure and velocity increase rapidly to expel the air at the frontal exhaust opening.

The application of a center intake centrifugal blower in this invention relies on the introduction of feed particulate or pellets into the low-pressure central intake area. In the air stream, the particulates are accelerated with the airflow along the impeller blades at a high velocity to rapidly exit from the exhaust opening at the front of the feeder. By creating and using a high velocity air stream or air flow to direct and accelerate the feed pellets a high efficiency is achieved with less friction on the impeller and case assembly. To simplify the means of injecting the feed pellets into the center intake opening, the blower assembly is tilted, e.g., thirty degrees, from vertical in reference to the hopper or bulk container. By tilting the blower a direct path is created from the hopper funnel to the blower intake, which eliminates the requirements for complicated chutes and elbows.

By utilizing a conventional scatter plate at the primary storage hopper funnel as the on/off switch to control the feed flow, the requirement for an actuated gate is eliminated. Further, by eliminating a shut-off gate, the associated baffles, which are often required to lesson the feed weight on the gate, are not required.

An application scenario is one where the centrifugal blower hopper and scatter plate assembly module mounted in a small housing unit can be attached to an existing barrel type scatter plate feeder to convert it to a directional feeder. The module can also be housed into a larger case with its own bulk storage and hopper for a stand-alone self-contained directional feeder.

In operation, the feed particulate or pellets are stored in a primary bulk container or hopper with a funnel at the base. This primary assembly may be a component in the stand-alone directional feeder or a barrel type scatter feeder, which is to be converted to or utilized as a directional feeder.

Either type of unit is controlled by a pre-programmed timer, which controls the sequence of operation. A feeding sequence begins by the timer turning on the centrifugal blower motor to bring it to operational speed. When the blower is at operational speed the timer will turn on the scatter plate drive motor thereby starting a metered flow of feed into the secondary hopper which will flow by gravity into the intake of the high speed centrifugal blower. As the feed is metered into the centrifugal blower's spiral air flow, it is accelerated along the compressor blades and propelled out of the frontal blower exhaust opening. The running cycle will continue until a pre-programmed time is reached at which point the timer will shut off the scatter plate drive motor which will stop the feed flow from the primary hopper. Power will continue to be delivered to the centrifugal blower for a short time sufficient for the blower to clear any feed residue in the assembly and then shut off. Through this sequence one full feed cycle has taken place. Multiple feed cycles and settings can be preprogrammed into the timer for around-the-clock unattended operation.

A primary object of the invention is to provide a high efficiency directional feeder module, which does not require the use of special shut off gates, baffles or chutes.

It is a further object of the invention to provide a means where the projection of the feed particulate is accomplished with a minimum of physical impact, friction or shredding of the feed.

It is also an object of the invention to provide the means whereby the feed pellets will be smoothly accelerated to a high velocity capable of propelling the feed up to sixty feet from the feeder assembly in a single direction.

Another object of the invention is to provide a modular component assembly being the air blower assembly, which contained in a small case, can be retrofitted to existing barrel type scatter feeders to convert them to directional feeders.

It is a further object of the invention to provide a directional feeder module, which can be attached to a bulk container of any size, which contains a gravity feed funnel, and convert it to a directional feeder.

It is also an object of the invention to provide self-contained directional feeders of different container capacities using common component modules.

BRIEF DESCRIPTION OF THE DRAWINGS

FIG. 1 is a drawing perspective of a self contained directional feeder in accordance with the present invention.

FIG. 2 is a drawing perspective of a typical drum barrel type scatter feeder which has been converted to a directional feeder by the addition of a small case retrofit module in accordance with the invention.

DETAILED DESCRIPTION OF THE INVENTION

The directional feeder assemblies shown in FIGS. 1 and 2 show two different embodiments of the present invention. Each embodiment utilizes the same primary centrifugal blower assembly, depicted in the exploded perspective detailed FIG. 5. The output or opening that discharges the feed pellets or aggregate is located at 31.

Figure 3:
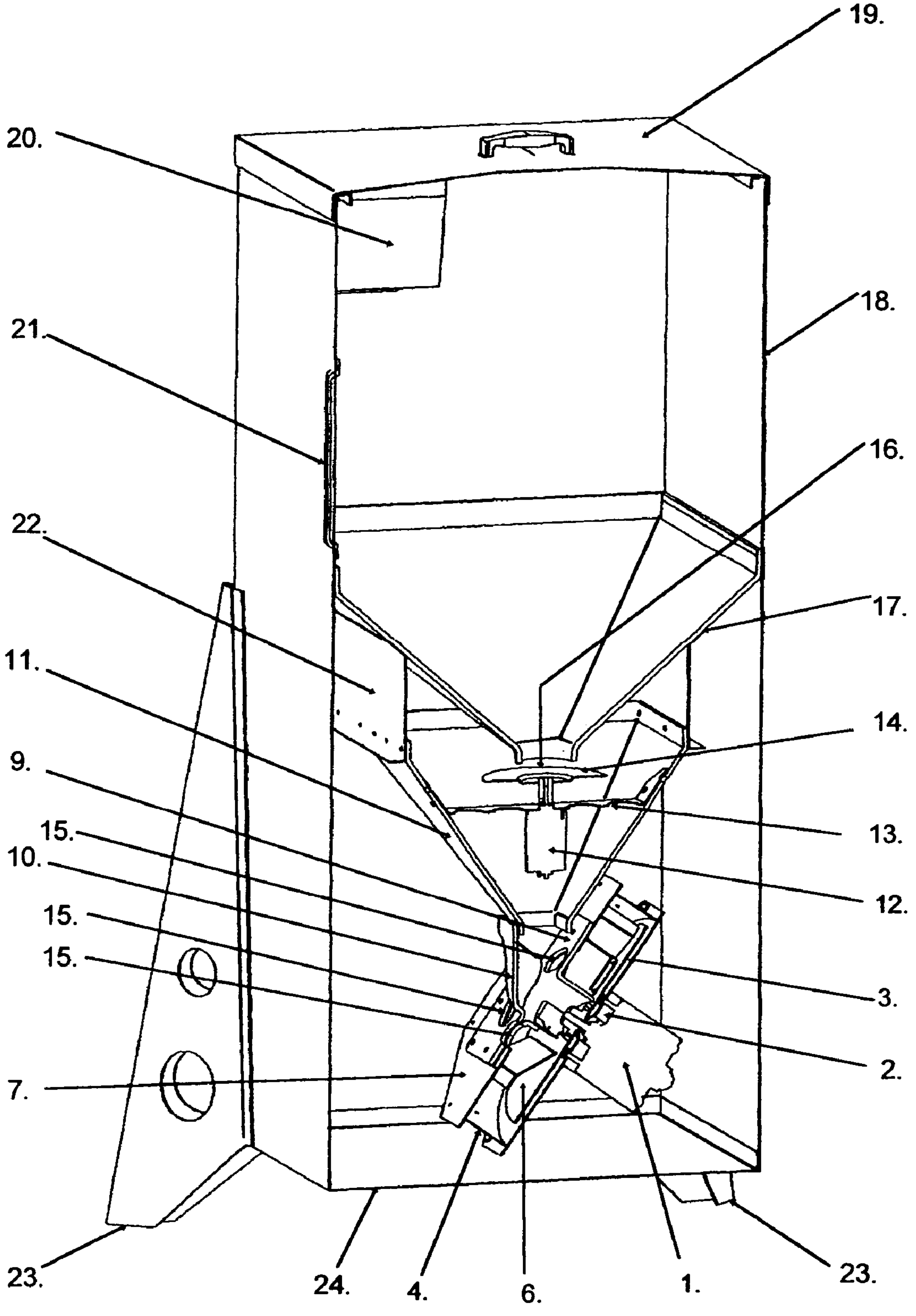
FIG. 3 is a perspective view of a self-contained feeder in accordance with the invention.

Drawing FIG. 3 shows a sectioned view of the embodiment of FIG. 1 which is a self-contained directional feeder of approximately 125 lbs capacity in this case. The feeder consists of an outer case 18 with four attached legs 23 and a removable cover 19. An internal battery and timer 20 power and control the sequence of operation. A transparent sight glass to enable viewing of the hopper feed level is shown at 21.

Hopper funnel 17 is attached to the outer case 18 at its top rim. Side support is provided by four ribs 22, which are attached to the outer case 18. These ribs 22 are used to attach the secondary collection funnel 11 and blower assembly shown in FIG. 5.

The bottom of the container 24 is perforated (not shown) to allow free air exchange to all areas below the primary hopper funnel 17.

Figure 4:
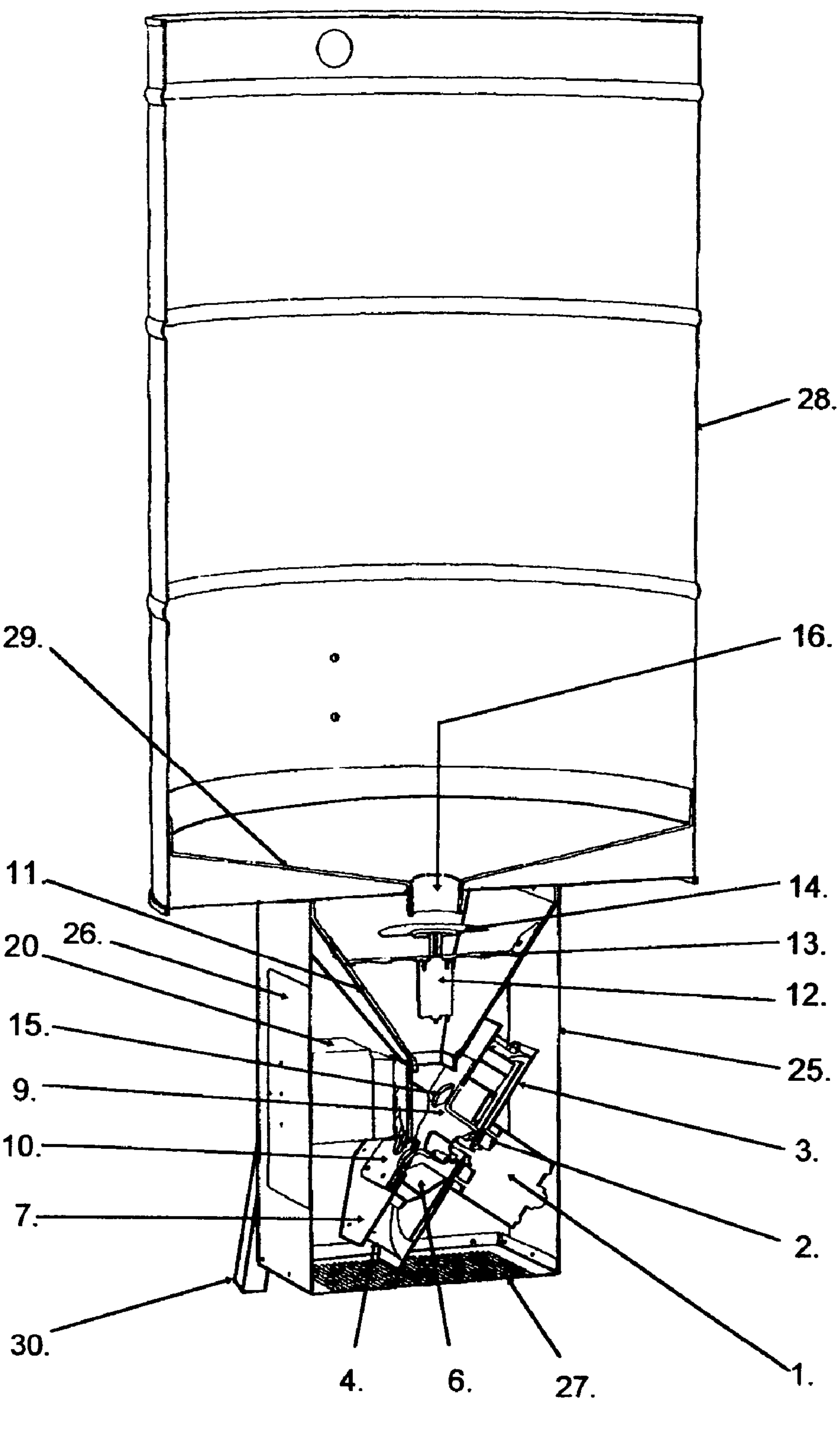
FIG. 4 is a cut-away perspective view of a drum type scatter feeder, converted to a directional feederin accordance with the invention.

FIG. 4 shows a sectional view of the embodiment of FIG. 2 consisting of a barrel type scatter feeder, which has been converted to a directional feeder according to the invention. The pre-existing components of the feeder consist of the drum 28 (for example, a typical 55 gallon drum can ge used) with three each legs attached 30. At the bottom of the drum 28 is the primary collection funnel 29. Attached to the bottom of the pre-existing barrel assembly is the primary blower assembly detailed in FIG. 5.

The blower assembly is attached to the barrel by its outer case 25 which contains the secondary funnel 11 attached within its outer rim. The outer case 25 has a side cutout 26 with the timer and battery assembly 20 affixed to the door for easy access. The outer case 25 has a perforated bottom 27 to provide free air exchange to the blower assembly detailed in FIG. 5.

Figure 5:
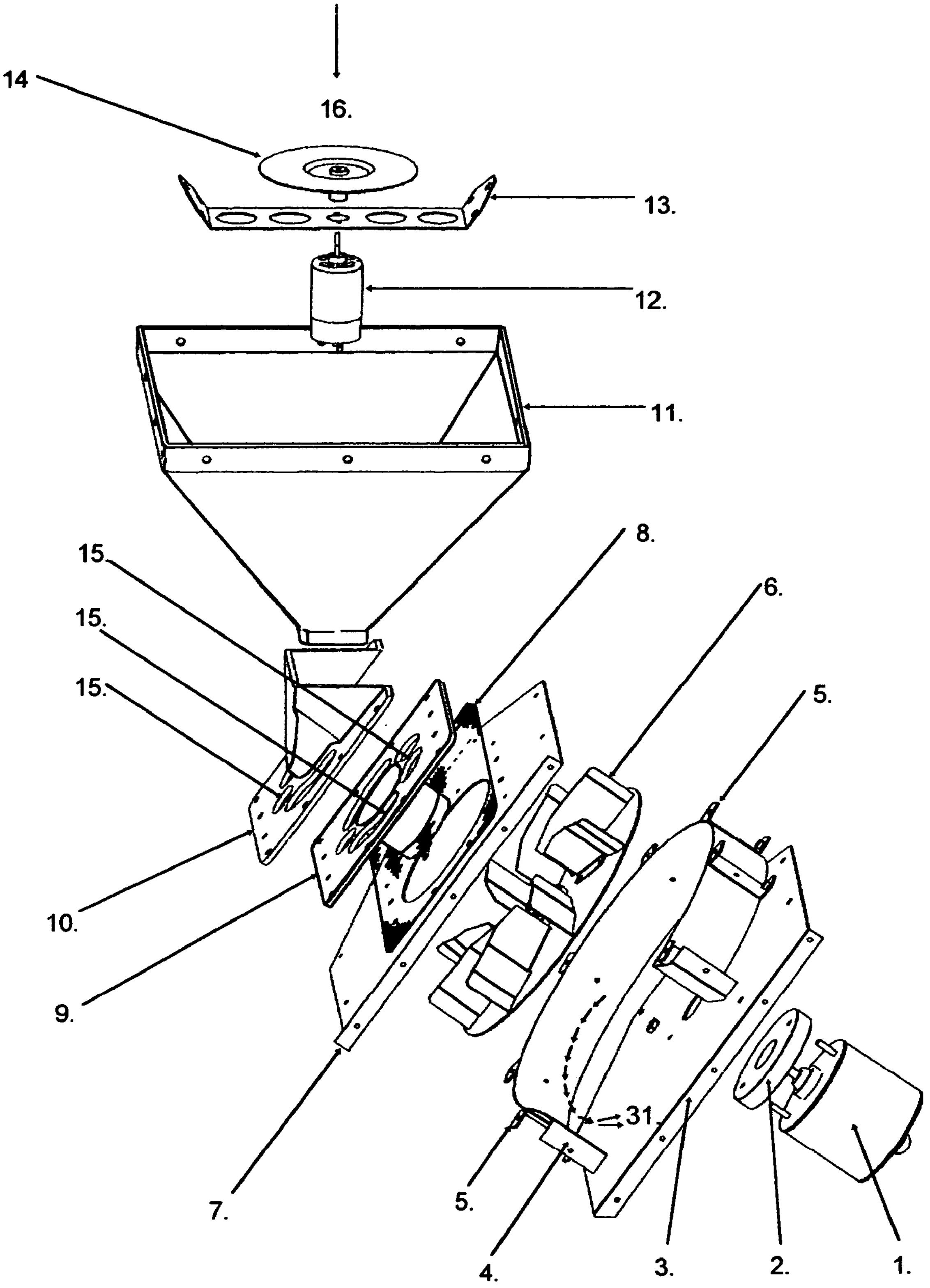
FIG. 5 is an exploded view of the directional feeder blower module assembly, according to the present invention.

FIG. 5 is an exploded view of the component parts that comprise the centrifugal blower assembly common to all feeders in accordance with the present invention. Electric motor 1 is attached to the blower base plate 3 through motor spacer plate 2. The base plate 3 is attached to a spiral shaped scroll housing 4 by means of a number of common spiral plate mounting brackets 5. Affixed to the motor output shaft is a centrifugal impeller assembly 6 that consists of seven shaped blades mounted on a rotation plate. The shaped blades are mounted around the periphery of the rotation plate and do not extend into the center of the assembly in order to provide an open central intake area for air and feed insertion. Atop the spiral impeller assembly is a top plate 7 which contains a large central opening for air intake and which is attached to the assembly by the spiral plate brackets 5.

Attached to the top plate 7 by common screws is a sandwich structure composed of a screen plate 8 and a feed tube plate 9 with a duel intake plate 10 on the outside. The duel intake plate 10 directs the feed particulate into the center and allow air to pass through cutouts 15 around its periphery. Matching cutouts 15 also exist around the protruding feed tube protrusion on the feed tube plate 9 to pass air into the impeller 6 opening. The screen plate 8 is composed of a flat screen with a center opening for the feed tube. The screen plate 8 prevents any stray feed particulate from escaping the blower assembly.

Seated above the duel intake plate 10 is the secondary hopper funnel 11. Attached across the hopper funnel 11 is a motor mount bracket 13 on which is mounted the scatter plate motor 12. The scatter plate 14 is fixed to the output shaft of motor 12. The scatter plate 14 is positioned to provide a feed particulate cone build up from the bulk container funnel 17 in FIG. 3 or bulk container funnel 29 in FIG. 4. This feed particulate cone build up occurs at location 16 and provides the function of releasing and metering the feed into the secondary funnel 11 when the scatter plate motor 12 is running, or prohibiting feed flow when the motor 12 is stationary.

In operation the feed particulate or pellets are stored in a bulk primary container hopper 18 or 28 with a funnel 17 or 29 located at its base. The operation of the system is controlled by a pre-programmed timer 20, which controls the sequence of operation. The directional broadcasting sequence begins by the timer switching ON the centrifugal blower motor 1. After a time delay for the blower motor to reach operational speed, the timer 20 will switch ON the scatter plate motor 12. Rotation of scatter plate 14 will cast a metered flow of feed from the feed cone build-up at location 16 into the secondary hopper 11 which, guided by the duel intake plate 10, will flow by gravity through the feed tube on the feed tube plate 9. The feed tube plate 9 has a section cut out of the feed tube such that the feed will flow into the intake of the high-speed centrifugal blower. As the feed is metered into the centrifugal blower's spiral airflow, it is accelerated along the impeller blades 6 and propelled out of the frontal blower exhaust opening at 31.

The running cycle will continue for a pre-programmed time, at which point the timer 20 will shut OFF the scatter plate drive motor 12, which will stop the feed flow from the primary hopper. The timer 20 will continue enabling power delivery to the centrifugal blower motor 1 for a short time, sufficient for the blower to clear any feed residue in the assembly, and then shut OFF.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A directional feeder system comprising:

a container which delivers feed particulate;

a feed guide portion comprising an opening through which the feed particulate, which is delivered from the container, passes;

a centrifugal air blower having blades position around a center portion to which the feed particulate is delivered, and a housing with an opening which expels air and the feed particulate; and the opening of the feed guide portion is aligned with the center portion of the centrifugal air blower so that the feed particulate is delivered to the center portion from the feed guide portion, wherein the feed particulate is drawn down through the center portion of the centrifugal air blower and accelerated by the air, and the feed particulate is dispensed from the opening of the housing.

2. A directional feeder system as claimed in claim 1, wherein said centrifugal air blower comprises an impeller comprising a plurality of blades fixed to an impeller plate, wherein the feed particulate is delivered to a center portion of the impeller plate from the center portion of the centrifugal air blower and as the impeller rotates the feed particulate travels with the air flow which is accelerated by the rotating blades, and the feed particulate is expelled from the side portion of the centrifugal air blower.

3. A directional feeder system as claimed in claim 2, wherein the centrifugal air blower further comprises a guide plate adjacent the impeller plate and operable to guide the accelerated air and feed particulate in a predetermined direction.

4. A directional feeder system as claimed in claim 2, wherein the air is accelerated in a spiraling fashion down through the center portion of the centrifugal air blower.

5. A directional feeder system as claimed in claim 4, wherein the feed particulate is assisted by the spiraling air flow as it travels down through the center portion of the centrifugal air blower and portions of the feed particulate have limited contact with the impeller blades as the air and feed particulate are expelled from the opening of the housing.

6. A directional feeder system as claimed in claim 1, wherein the feed guide portion comprises a feed tube plate and the opening is defined by a cylindrical portion extending from the feed tube plate.

7. A directional feeder system as claimed in claim 1, wherein the feed guide portion includes at least one additional opening through which the air is drawn into the centrifugal air blower.

8. A directional feeder system as claimed in claim 1, wherein the container comprises a hopper funnel with an exit opening, and an axis of rotation of the centrifugal air blower is slanted with respect to a center axis of the hopper funnel extending through the opening.

9. A directional feeder system as claimed in claim 1, wherein a dual intake plate is disposed between the container and the feed guide portion, the dual intake plate has at least one hole which provides an air flow channel to the centrifugal air blower, the air flow channel being separate from the opening of the feed guide portion.

10. A directional feeder system as claimed in claim 6, wherein a top plate is disposed between the centrifugal air blower and the feed tube plate, the top plate has an opening through which the cylindrical portion extends.

11. A directional feeder system as claimed in claim 9, wherein a top plate is disposed between the centrifugal air blower and the feed guide portion, the top plate has an opening which encompasses the at least one hole of the dual plate and the opening of the feed guide portion.

* * * * *

UNITED STATES PATENT AND TRADEMARK OFFICE

CERTIFICATE OF CORRECTION

PATENT NO. : 7,222,583 B2
APPLICATION NO. : 10/833292
DATED : May 29, 2007
INVENTOR(S) : H. Dell Foster It is certified that error appears in the above-identified patent and that said Letters Patent is hereby corrected as shown below:

Col. 5,
Claim 1, line 6, delete "position" and insert --positioned--.

Signed and Sealed this

Twenty-sixth Day of February, 2008

JON W. DUDAS
*Director of the United States Patent and Trademark Office*

UNITED STATES PATENT AND TRADEMARK OFFICE

CERTIFICATE OF CORRECTION

PATENT NO. : 7,222,583 B2
APPLICATION NO. : 10/833292
DATED : May 29, 2007
INVENTOR(S) : H. Dell Foster It is certified that error appears in the above-identified patent and that said Letters Patent is hereby corrected as shown below:

Col. 5,
Claim 1, line 32, delete "position" and insert --positioned--.

This certificate supersedes the Certificate of Correction issued February 26, 2008.

Signed and Sealed this

Eighteenth Day of March, 2008

JON W. DUDAS
*Director of the United States Patent and Trademark Office*